US012654335B2

(12) United States Patent　(10) Patent No.:　US 12,654,335 B2
Cheng et al.　(45) Date of Patent:　Jun. 16, 2026

(54) TRANSFERRING SYSTEM

(71) Applicant: TOYO AUTOMATION CO., LTD., Tainan City (TW)

(72) Inventors: Ming-Te Cheng, Tainan City (TW); Min-Ling Tu, Tainan City (TW); Yu-Lin Tai, Tainan City (TW)

(73) Assignee: TOYO AUTOMATION CO., LTD., Tainan City (TW)

( * ) Notice: Subject to any disclaimer, the term of this patent is extended or adjusted under 35 U.S.C. 154(b) by 981 days.

(21) Appl. No.: 17/844,679

(22) Filed: Jun. 20, 2022

(65) Prior Publication Data

US 2023/0256623 A1　Aug. 17, 2023

(30) Foreign Application Priority Data

Jan. 26, 2022　(TW) ................................. 111103405

(51) Int. Cl.
*B25J 15/06*　(2006.01)
*B25J 9/16*　(2006.01)
*B25J 13/08*　(2006.01)

(52) U.S. Cl.
CPC ......... *B25J 15/0658* (2013.01); *B25J 9/1612* (2013.01); *B25J 9/1697* (2013.01); *B25J 13/085* (2013.01)

(58) Field of Classification Search
None
See application file for complete search history.

(56) References Cited

U.S. PATENT DOCUMENTS

| | | | | |
|---|---|---|---|---|
| 3,834,558 | A | * | 9/1974 | Bru ........................ B66C 1/0212 |
| | | | | 414/797 |
| 3,973,682 | A | * | 8/1976 | Neff .................... H01L 21/6838 |
| | | | | 294/186 |
| 4,852,247 | A | * | 8/1989 | Hawkswell ............ B65G 47/91 |
| | | | | 294/2 |
| 5,374,158 | A | * | 12/1994 | Tessier ............... G01R 31/2893 |
| | | | | 414/742 |
| 11,084,175 | B2 | * | 8/2021 | Polido .................. B25J 15/0061 |
| 11,285,083 | B1 | * | 3/2022 | Karpman .................. A61J 1/00 |
| 2013/0108409 | A1 | * | 5/2013 | Wu .................... H01L 21/67766 |
| | | | | 414/800 |
| 2013/0212883 | A1 | * | 8/2013 | Soto Martinez ....... B21J 15/022 |
| | | | | 81/57.37 |

(Continued)

FOREIGN PATENT DOCUMENTS

KR　　　2012095323　A　*　8/2012

*Primary Examiner* — William A. Rivera

(74) *Attorney, Agent, or Firm* — MUNCY, GEISSLER, OLDS & LOWE, P.C.

(57)　ABSTRACT

A transferring system includes a moving unit, a base unit secured on the moving unit, a suspension unit disposed on the base unit, a carrying unit, a measuring unit secured on the suspension unit, and a controller connected to the moving unit, the carrying unit and the measuring unit. The carrying unit includes a rotary motor and a rotary encoder secured on the suspension unit, and a tube carrying a target object. The rotary motor drives the tube to revolve. The measuring unit includes a force sensor in contact with the base unit. The controller controls operations of the moving unit and the rotary motor according to an angular position of the tube detected by the rotary encoder and a force detected by the force sensor.

8 Claims, 13 Drawing Sheets

(56)                    References Cited

U.S. PATENT DOCUMENTS

| | | | |
|---|---|---|---|
| 2015/0016933 A1* | 1/2015 | Ochiishi | B25J 15/0616 |
| | | | 414/730 |
| 2021/0107106 A1* | 4/2021 | Haruna | B25B 11/005 |
| 2023/0271337 A1* | 8/2023 | Brinckmann | B25J 15/0683 |
| | | | 294/183 |
| 2024/0300751 A1* | 9/2024 | Brinckmann | B29D 11/0024 |
| 2025/0128430 A1* | 4/2025 | Kwon | B25J 15/12 |

* cited by examiner

TRANSFERRING SYSTEM

CROSS-REFERENCE TO RELATED APPLICATION

This application claims priority of Taiwanese Invention Patent Application No. 111103405, filed on Jan. 26, 2022.

FIELD

The disclosure relates to a transferring system, and more particularly to a transferring system for transferring a target object in an automatic production line.

BACKGROUND

Chinese Invention Patent Publication No. CN112659169 discloses an automatic assembling system for assembling a mobile phone with a flexible printed circuit (FPC) cable. The automatic assembling system includes a mobile-phone jig for holding the mobile phone, an FPC-cable jig for holding the FPC cable, a manipulator for transferring the FPC cable to the mobile phone, and a workbench on which the manipulator, the mobile-phone jig and the FPC-cable jig are mounted. The manipulator is equipped with a suction device to suck and carry the FPC cable. The suction device includes a fixed seat, a bracket connected to the fixed seat via a force sensor, and a sucking nozzle mounted on the bracket. The force sensor is configured to detect a force exerted thereon when the FPC cable is brought to contact with the mobile phone, and a force exerted on the mobile phone will be maintained at a magnitude no greater than 10 N by feedback control techniques according to the force detected by the force sensor. It should be noted that since the force sensor is connected directly between the fixed seat and the bracket, it also serves as a support structure for carrying the FPC cable.

SUMMARY

Therefore, an object of the disclosure is to provide a transferring system that can alleviate at least one of the drawbacks of the prior art.

According to the disclosure, the transferring system is adapted to transfer a target object. The transferring system includes a moving unit, a base unit, a suspension unit, a carrying unit, a measuring unit and a controller.

The moving unit includes a main body, and a driving component that is configured to drive the main body to move in a first direction.

The base unit includes a connecting part and an extension part. The connecting part is secured on the main body so as to move with the main body together in the first direction, is formed with a guiding groove that extends in the first direction and that faces away from the main body, and has two ends opposite to each other in the first direction. The extension part is connected to one of the two ends of the connecting part, extends in a second direction that is perpendicular to the first direction, and is formed with a first through hole that extends through the extension part in the first direction and that is in spatial communication with the guiding groove, and a second through hole that extends through the extension part in the first direction and that is spaced apart from the first through hole in the second direction.

The suspension unit includes a connecting component and a carrier. The connecting component is disposed on the extension part and extends through the first through hole.

The carrier is disposed movably in the guiding groove, is connected to the connecting component, and has a part exposed out of the guiding groove in the second direction.

The carrying unit includes a tube, a rotary motor and a rotary encoder. The tube extends through the second through hole and is configured to carry the target object. The rotary motor is secured on the carrier and is configured to drive the tube to revolve in the second through hole. The rotary encoder is secured on the carrier and is configured to detect an angular position of the tube.

The measuring unit includes a base secured on the carrier, and a force sensor mounted on the base that is in contact with the extension part to detect force exerted on the force sensor.

The controller is electrically connected to the driving component, the rotary motor, the rotary encoder and the force sensor, and is configured to control operations of the driving component and the rotary motor according to the angular position of the tube detected by the rotary encoder and the force detected by the force sensor.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
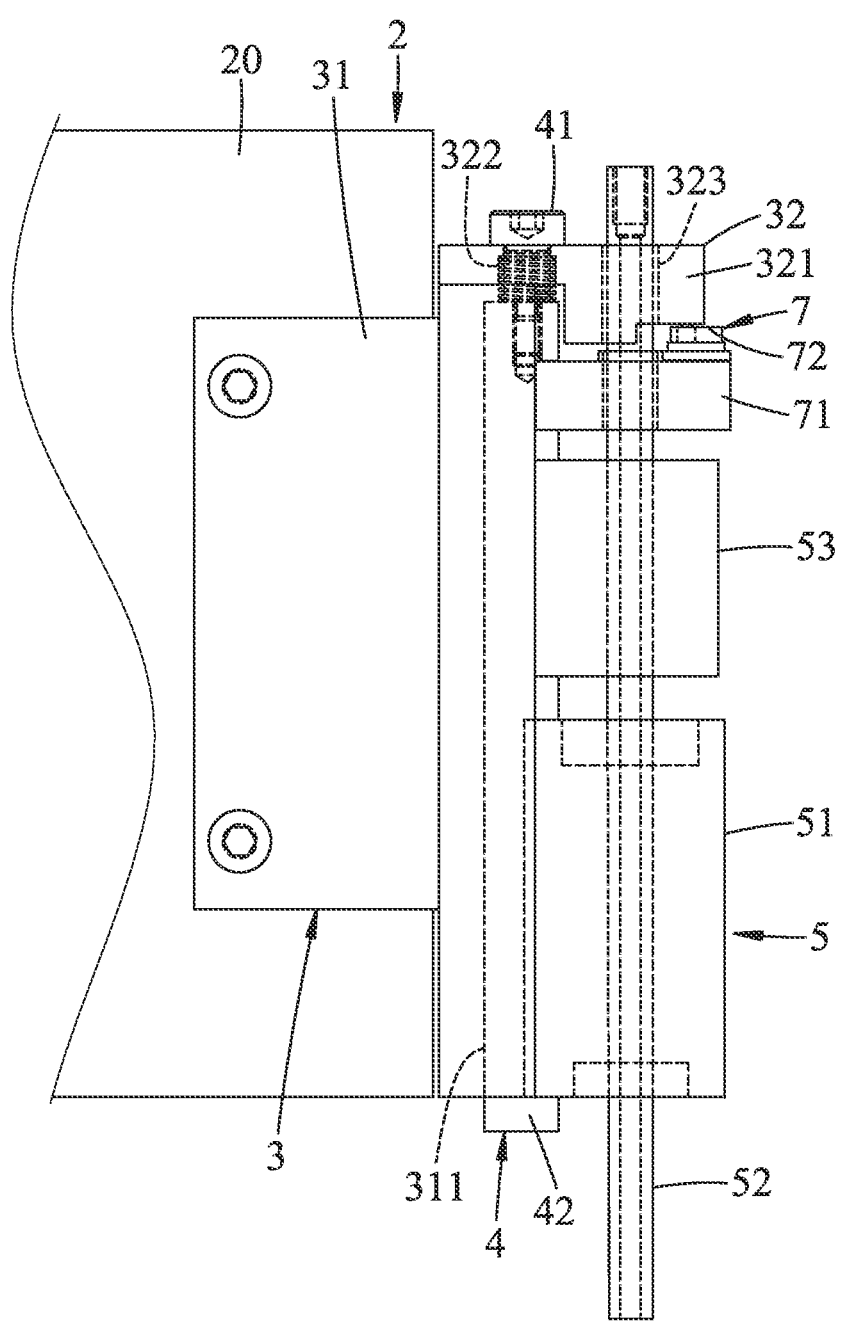
FIG. 1 is a side view illustrating a transferring system according to an embodiment of the disclosure.
Figure 2:
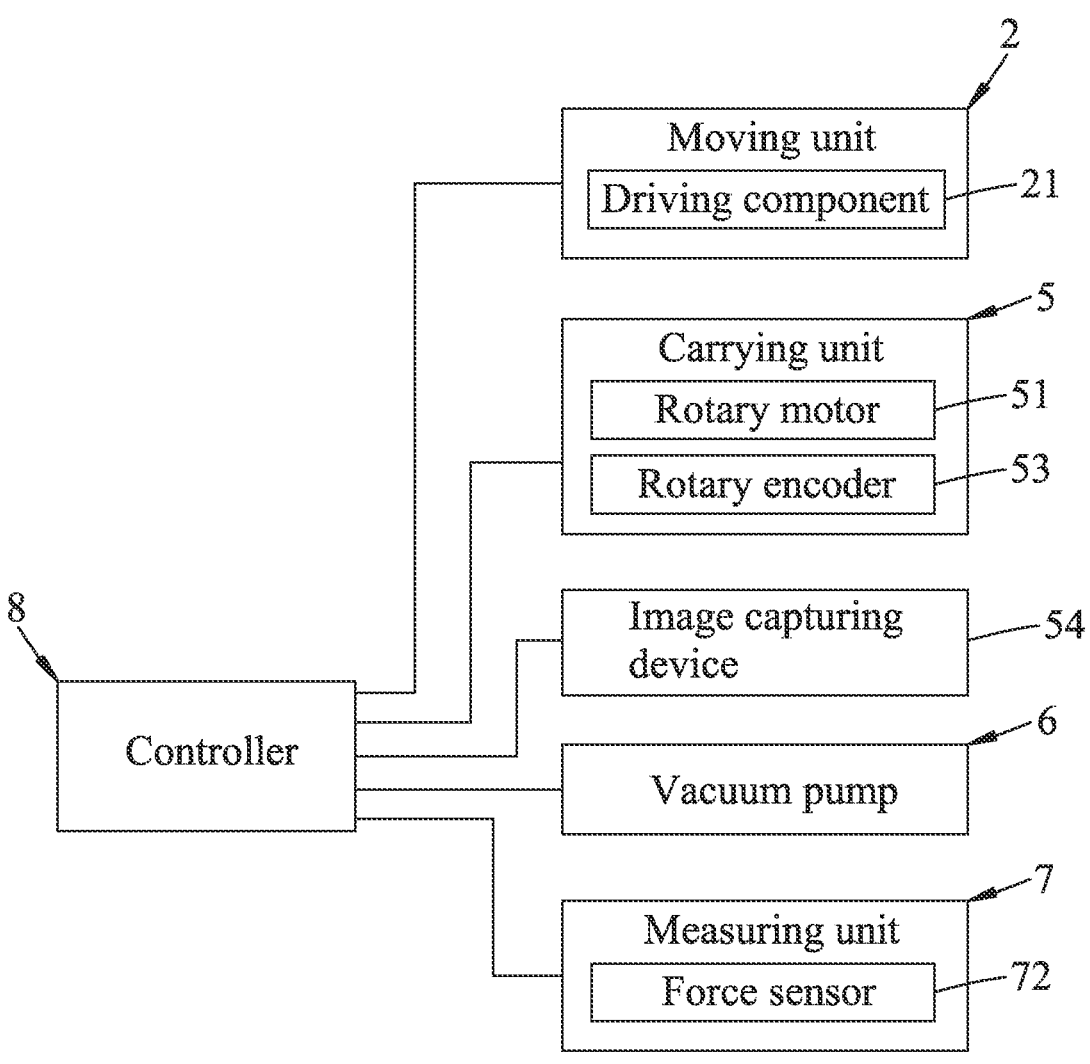
FIG. 2 is a block diagram illustrating the transferring system according to the embodiment of the disclosure.
Figure 3:
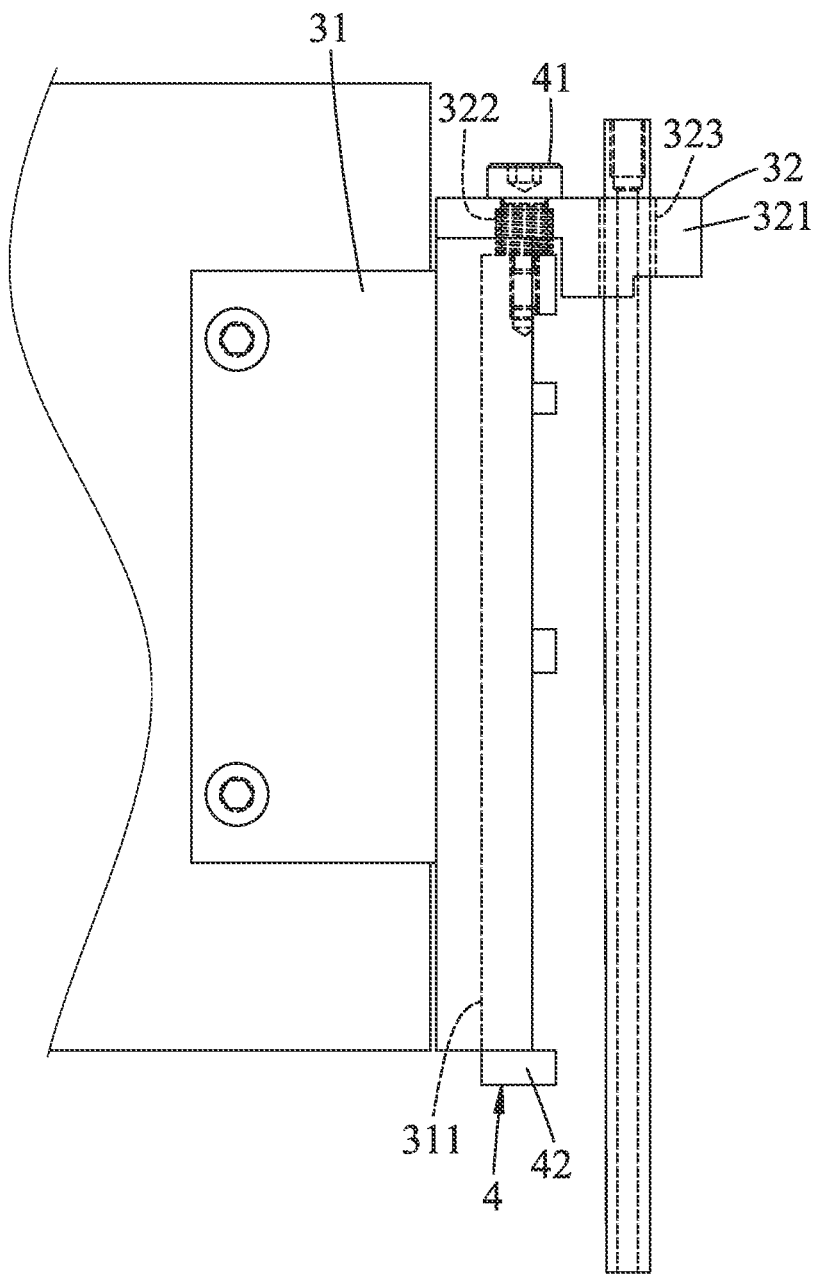
FIG. 3 is another side view illustrating the transferring system according to the embodiment of the disclosure.

Referring to FIGS. 1 to 3, an embodiment of a transferring system according to the disclosure is illustrated. The transferring system is adapted to transfer a target object 91 (see FIG. 6) in an automatic production line.

The transferring system includes a moving unit 2, a base unit 3, a suspension unit 4, a carrying unit 5, an image capturing device 54, a vacuum pump 6, a measuring unit 7 and a controller 8.

The moving unit 2 includes a main body 20, and a driving component 21 that is configured to drive the main body 20 to move in a first direction. In this embodiment, the driving component 21 is implemented by a linear motor, and the first direction is a vertical direction (i.e., the up-down direction of FIG. 1). Since implementation of the linear motor has been well known to one skilled in the relevant art, detailed explanation of the same is omitted herein for the sake of brevity. It should be noted that the moving unit 2 may further include a manipulator (not shown) for moving the main body 20 in multiple directions (e.g., horizontal directions perpendicular to the vertical direction).

The base unit 3 includes a connecting part 31 and an extension part 32. The connecting part 31 is secured on the main body 20 so as to move with the main body 20 together in the first direction. The connecting part 31 is formed with a guiding groove 311 that extends in the first direction and that faces away from the main body 20. The connecting part 31 has two ends opposite to each other in the first direction. The extension part 32 is connected to one of the two ends of the connecting part 31. For example, the extension part 32 is connected to an upper one of the two ends of the connecting part 31 as shown in FIG. 1. The extension part 32 extends in a second direction that is perpendicular to the first direction (i.e., a horizontal direction). The extension part 32 is formed with a first through hole 322 and a second through hole 323. The first through hole 322 extends through the extension part 32 in the first direction and is in spatial communication with the guiding groove 311. The second through hole 323 extends through the extension part 32 in the first direction and is spaced apart from the first through hole 322 in the second direction. The first through hole 322 is closer to the main body 21 of the moving unit 2, and the second through hole 323 is farther from the moving unit 2.

Figure 4:
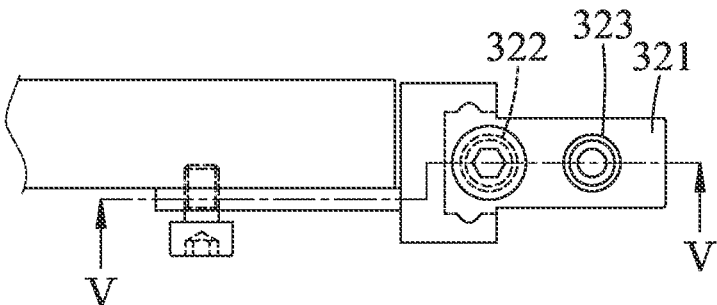
FIG. 4 is a top view illustrating the transferring system according to the embodiment of the disclosure.
Figure 5:
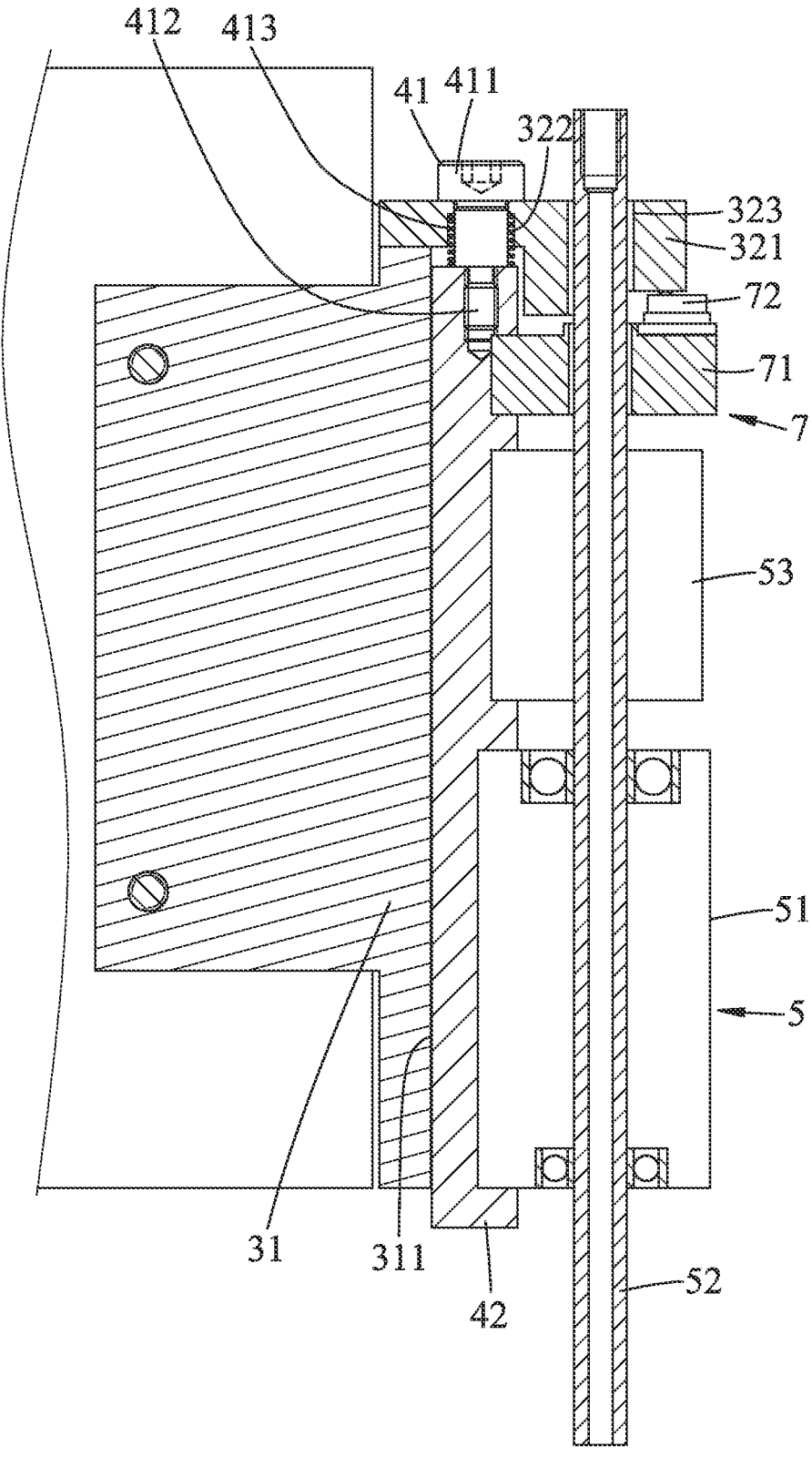
FIG. 5 is a cross-sectional view of the transferring system along a sectional line V-V in FIG. 4.

Referring to FIGS. 3 to 5, the suspension unit 4 includes a connecting component 41 and a carrier 42. The connecting component 41 is disposed on the extension part 32 and extends through the first through hole 322. The carrier 42 is disposed movably in the guiding groove 311. The carrier 42 is connected to the connecting component 41 and has a part exposed out of the guiding groove 311 in the second direction.

Specifically, the connecting component 41 includes a head portion 411, an extending portion 412 and an elastic element 413. The head portion 411 is positioned outside of the first through hole 322 of the extension part 32 and has an external diameter greater than an internal diameter of the first through hole 322. The extending portion 412 extends from the head portion 411 in the first direction. The extending portion 412 has an external diameter smaller than the external diameter of the head portion 411. The extending portion 412 passes through the first through hole 322 of the extension part 32 and is connected to the carrier 42. The elastic element 413 is disposed between the extension part 32 and the carrier 42 to buffer a collision between the extension part 32 and the carrier 42. In this embodiment, the elastic element 413 is a helical compression spring that surrounds a part of the extending portion 412.

Referring to FIGS. 2 and 5, the carrying unit 5 includes a rotary motor 51, a tube 52 and a rotary encoder 53. The tube 52 is made of rigid material, and extends through the second through hole 323 and is configured to carry the target object 91. The rotary motor 51 is secured on the carrier 42 and is configured to drive the tube 52 to revolve in the second through hole 323. The rotary encoder 53 is secured on the carrier 42, and is configured to detect an angular position of the tube 52 and to output a coded signal indicating the angular position of the tube 52.

The image capturing device 54 may be implemented by a camera or a video recorder, but is not limited thereto.

The vacuum pump 6 is in spatial communication with the tube 52. The vacuum pump 6 is configured to vacuumize the tube 52 and break vacuum in the tube 52. Since vacuum technology has been well known to one skilled in the relevant art, detailed explanation of the same is omitted herein for the sake of brevity.

The measuring unit 7 includes a base 71 secured on the carrier 42, and a force sensor 72 mounted on the base 71. The force sensor 72 is in contact with the extension part 32 to detect force exerted on the force sensor 72 by the extension part 32. In this embodiment, the force sensor 72 is implemented by a strain gauge, but implementation of the force sensor 72 is not limited to what is disclosed herein and may vary in other embodiments.

The controller 8 is electrically connected to the driving component 21, the rotary motor 51, the rotary encoder 53, the image capturing device 54, the vacuum pump 6 and the force sensor 72. The controller 8 is configured to control operations of the driving component 21 and the rotary motor 51 according to the angular position of the tube 52 detected by the rotary encoder 53 and the force detected by the force sensor 72.

Figure 6:
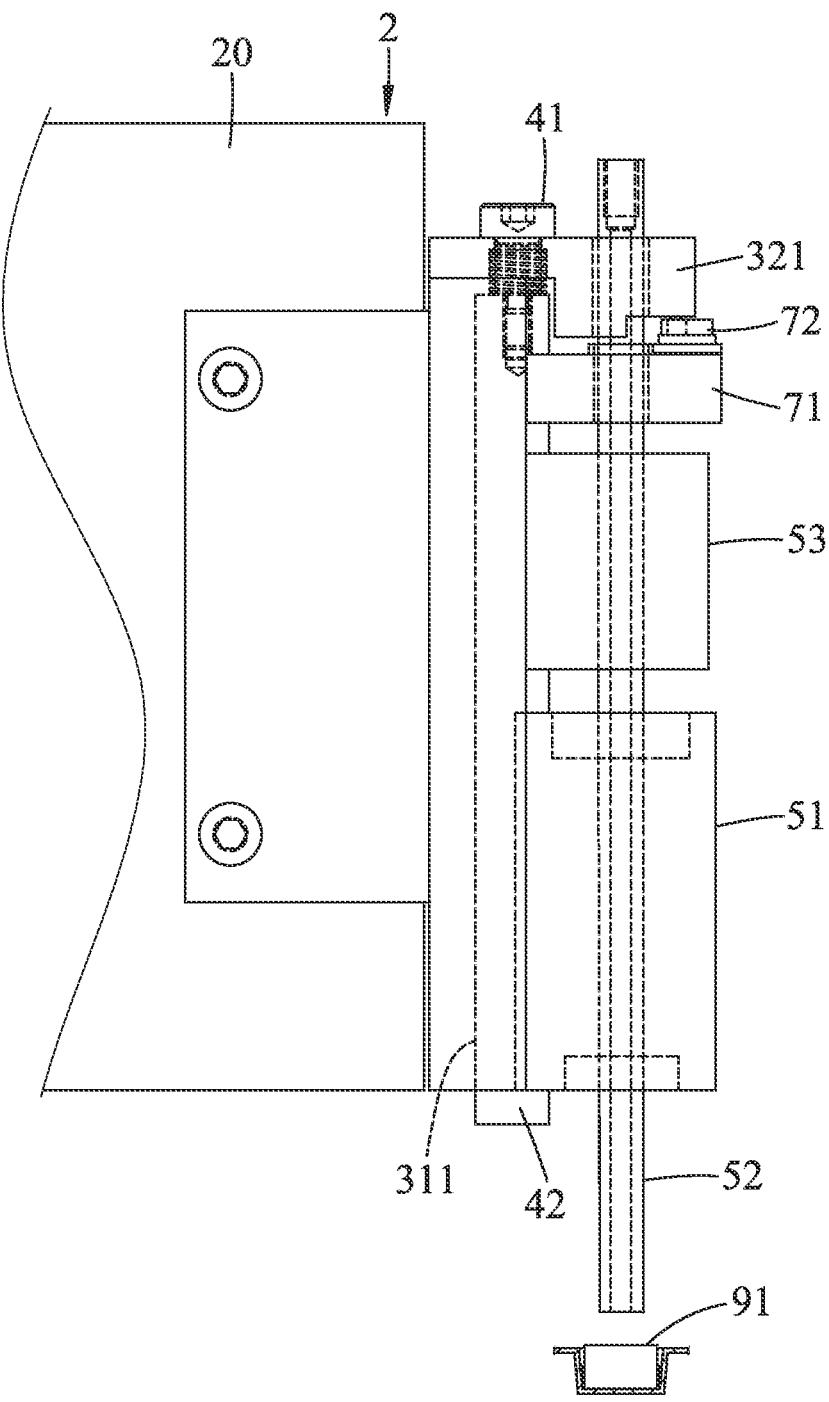
FIGS. 6 to 9 are side views illustrating an example of moving a target object by using the transferring system according to the disclosure.
Figure 7:
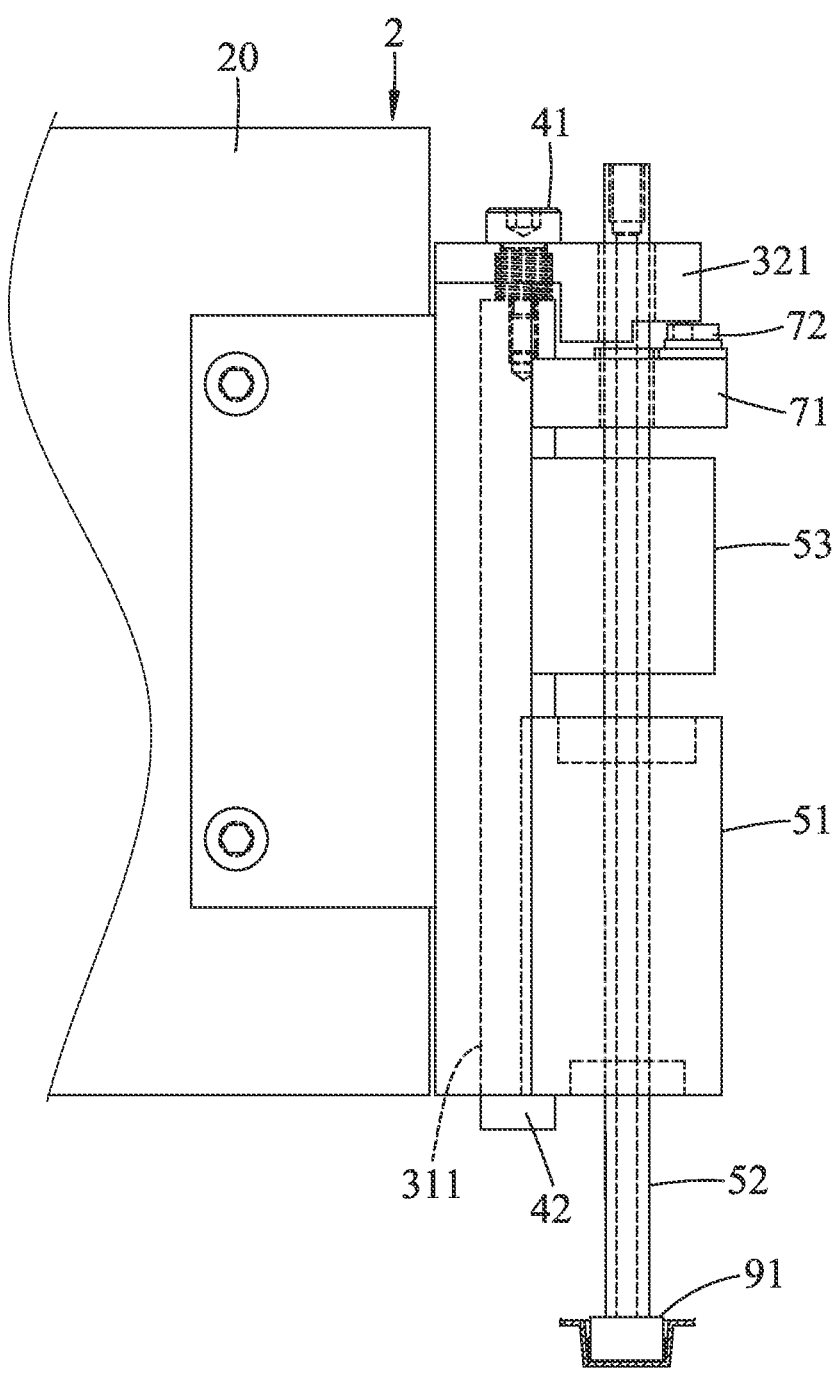
Figure 8:
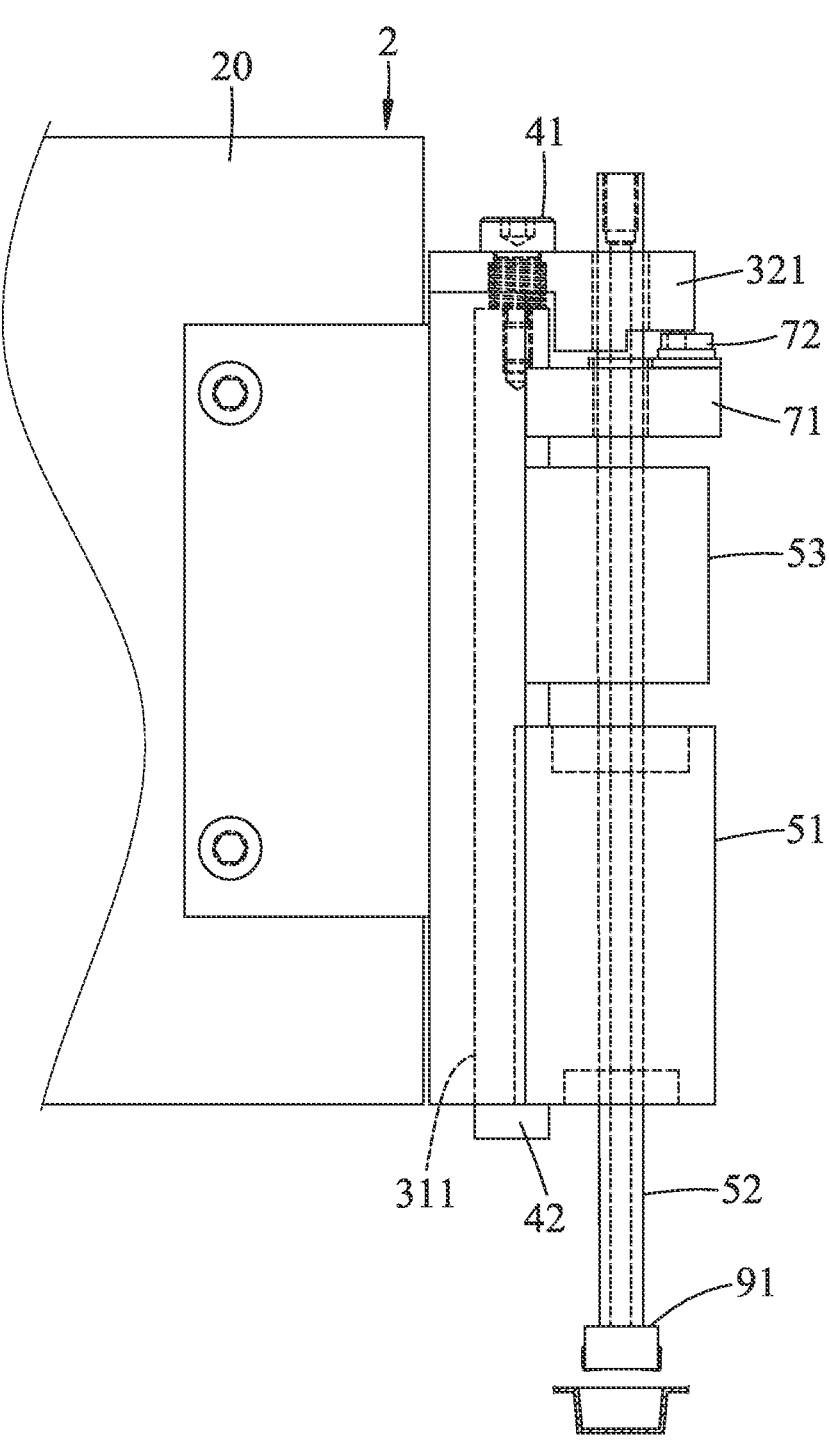

Specifically, referring to FIGS. 6 to 8, in order to carry the target object 91, the controller 8 is configured to first control the moving unit 2 to move the main body 20 to a position where the tube 52 is aligned with the target object 91 in the first direction and above the target object 91 as shown in FIG. 6. Then, the controller 8 is configured to further control the driving component 21 to move the main body 20 in the first direction so as to make the tube 52 move toward the target object 91 (i.e., to make the tube 52 move downward to the target object 91 until the tube 52 reaches the target object 91) as shown in FIG. 7, and to control the vacuum pump 6 to vacuumize the tube 52 so as to carry the target object 91 upward by sucking as shown in FIG. 8 when it is determined that the force exerted on the force sensor 72 achieves a first predetermined threshold (e.g., 2 N).

It should be noted that, when the tube 52 is in contact with the target object 91, the tube 52 and the target object 91 exert forces having the same magnitude on each other according to Newton's third law of motion, and the force exerted on the tube 52 by the target object 91 makes the carrier 42 move upward in the guiding groove 311 with the tube 52 together. Accordingly, the base 71 moves upward with the carrier 42 together, and thus the force sensor 72 secured on the base 71 is pressed by the extension part 32 and may detect the force exerted thereon by the extension part 32.

Figure 9:
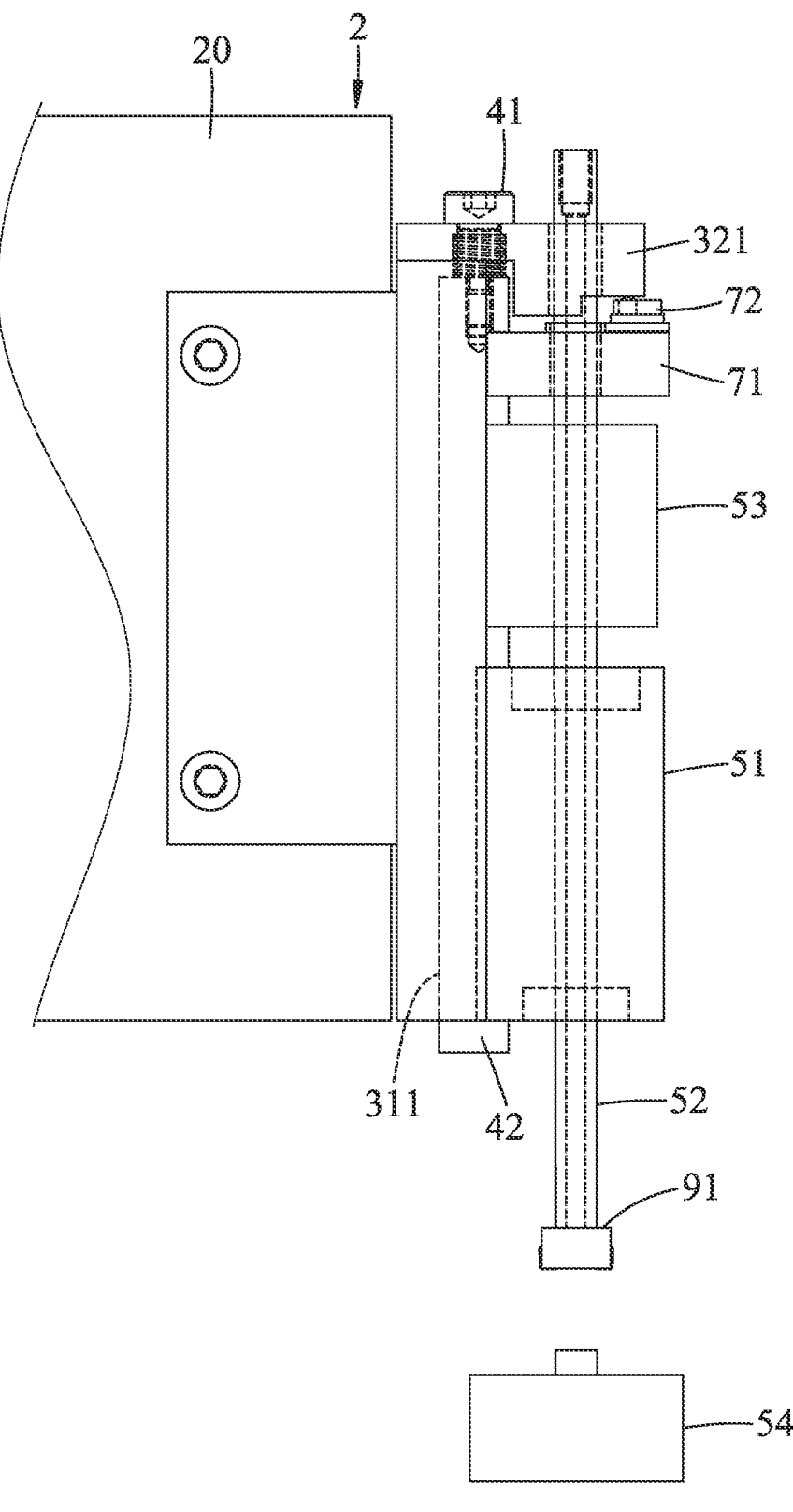
Figure 10:
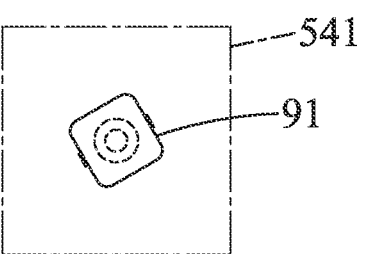
FIGS. 10 and 11 are schematic diagrams illustrating an example of rotating the target object by using the transferring system according to the disclosure.
Figure 11:
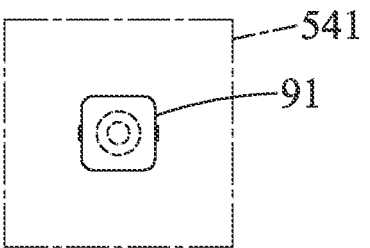

Moreover, referring to FIGS. 9 and 10, when the target object 91 is carried by the tube 52, the controller 8 is configured to control the moving unit 2 to move to a position where the tube 52 is aligned with the image capturing device 54 in the first direction such that the target object 91 is positioned above the image capturing device 54 as shown in FIG. 9 for the image capturing device 54 to be able to capture an image of the target object 91 from the bottom thereof. Then, the controller 8 is configured to control the image capturing device 54 to capture an image of the target object 91 to result in an object image 541 (FIG. 10), and to determine an angular displacement of the target object 91 from a preferred angular position by comparing the object image 541 with a reference image that is related to a reference object at the preferred angular position. Subsequently, the controller 8 is configured to control, based on the angular displacement, the rotary motor 51 to drive the tube 52 to rotate in a manner that the target object 91 is rotated to the preferred angular position. In this way, the target object 91 would be rotated to have an arrangement identical to that of the reference object in the reference image as shown in FIG. 11. In particular, to accurately drive rotating the tube 52, the controller 8 is configured to control the rotary motor 51 to drive the tube 52 to revolve by using feedback control techniques based on the angular position of the tube 52 detected by the rotary encoder 53. For example, in a scenario where the angular displacement is 5° 23'19", the controller 8 would keep controlling the rotary motor 51 to drive the tube 52 to revolve until the controller 8 determines that an amount of rotation of the tube 52 has reached 5° 23'19", based on the coded signal outputted by the rotary encoder 53.

Figure 12:
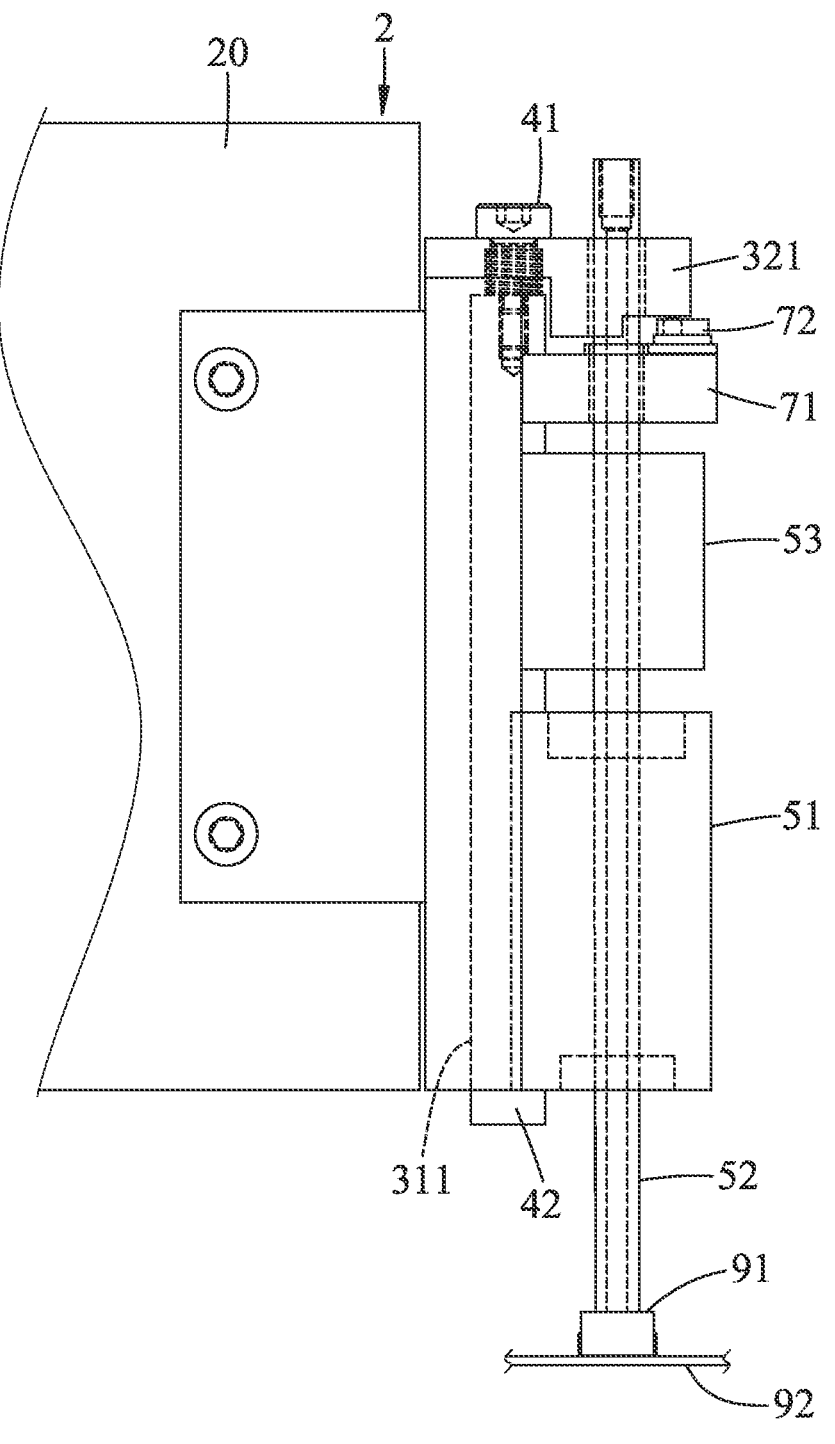
FIGS. 12 and 13 are side views illustrating an example of carrying and releasing the target object by using the transferring system according to the disclosure.
Figure 13:
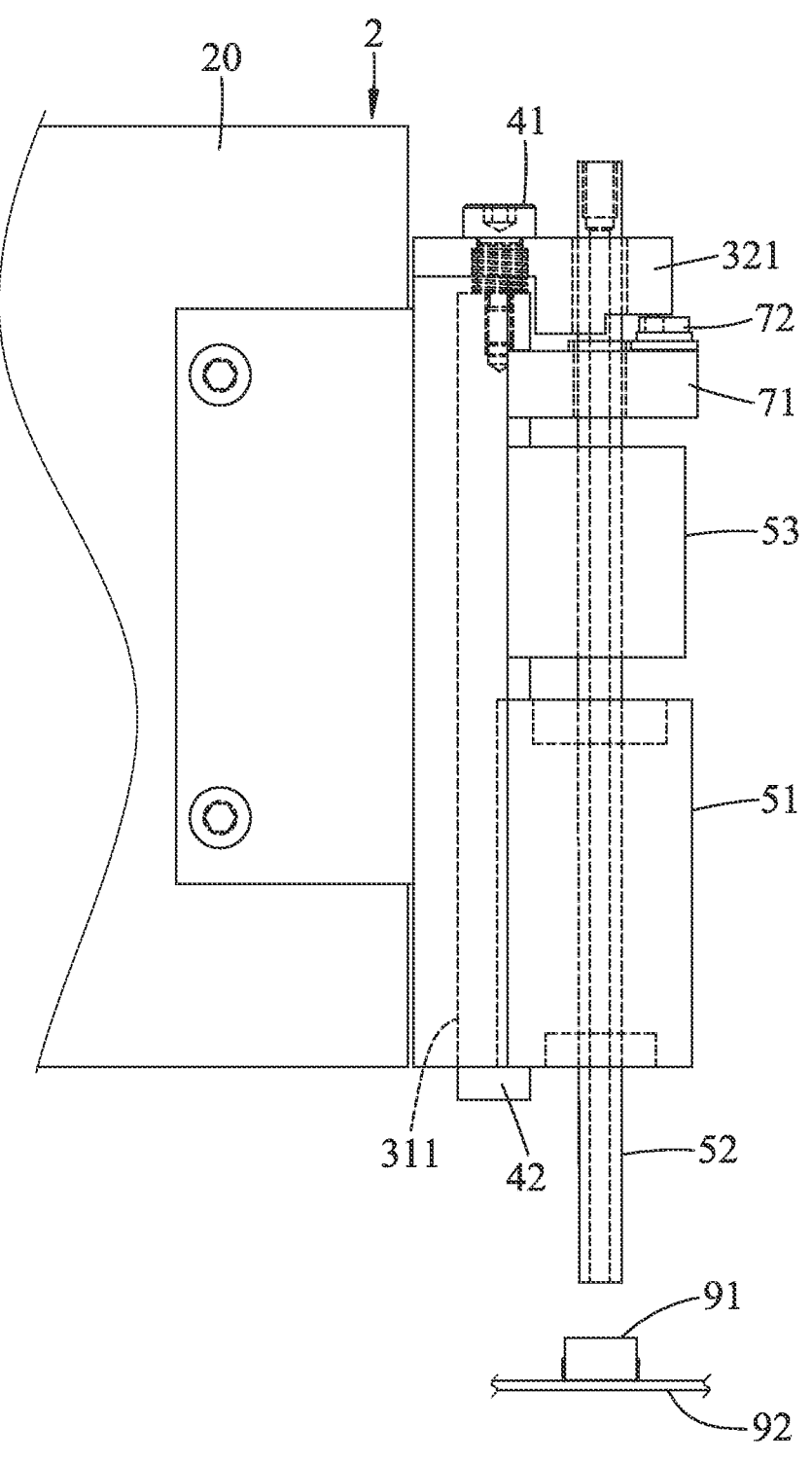

Referring to FIGS. 12 and 13, the controller 8 is further configured, when the target object 91 is carried by the tube 52, to control the moving unit 2 to move the target object 91 to a target position where the tube 52 is aligned with a substrate 92, to control the driving component 21 to move the main body 20 in the first direction so as to make the tube 52 move toward the substrate 92 (i.e., to make the tube 52 move downward) until the target object 91 reaches the substrate 92 as shown in FIG. 12, and to control the vacuum pump 6 to break vacuum in the tube 52 so as to release the target object 91 when it is determined that the force exerted on the force sensor 72 achieves a second predetermined threshold (e.g., 2 N). Afterwards, the controller 8 is configured to control the driving component 21 to move the main body 20 upward and leave the target object 91 on the substrate 92 for further processing as shown in FIG. 13.

In summary, with regard to the transferring system according to the disclosure, the force sensor 72 is mounted on the base 71 that is secured to the carrier 42 and is arranged to be in contact with the extension part 32 to detect force exerted on the force sensor 72 by the extension part 32. The controller 8 is configured to control the vacuum pump 6 to vacuumize the tube 52 to carry the target object 91 by sucking according to the force detected by the force sensor 72. Since the force sensor 72 is not involved in upholding the tube 52, the force sensor 72 is capable of making sensitive and accurate detection of force, thereby improving precision of operations performed by the transferring system according to the disclosure.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A transferring system adapted to transfer a target object, said transferring system comprising:
   a moving unit including a main body, and a driving component that is configured to drive said main body to move in a first direction;

a base unit including
   a connecting part that is secured on said main body so as to move together with said main body in the first direction, that is formed with a guiding groove that extends in the first direction and that faces away from said main body, and that has two ends opposite to each other in the first direction, and
   an extension part that is connected to one of said two ends of said connecting part, that extends in a second direction that is perpendicular to the first direction, and that is formed with
      a first through hole that extends through said extension part in the first direction and that is in spatial communication with said guiding groove, and
      a second through hole that extends through said extension part in the first direction and that is spaced apart from said first through hole in the second direction;
a suspension unit including
   a connecting component that is disposed on said extension part and that extends through said first through hole, and
   a carrier that is disposed movably in said guiding groove, that is connected to said connecting component, and that has a part exposed out of said guiding groove in the second direction;
a carrying unit including
   a tube that extends through the second through hole and that is configured to carry the target object,
   a rotary motor that is secured on said carrier and that is configured to drive said tube to revolve in the second through hole, and
   a rotary encoder that is secured on said carrier and that is configured to detect an angular position of said tube;
a measuring unit including a base secured on said carrier, and a force sensor mounted on said base in contact with said extension part to detect force exerted on said force sensor; and
a controller electrically connected to said driving component, said rotary motor, said rotary encoder and said force sensor, and configured to control operations of said driving component and said rotary motor according to the angular position of said tube detected by said rotary encoder and the force detected by said force sensor.

2. The transferring system as claimed in claim 1, further comprising a vacuum pump that is electrically connected to said controller, that is in spatial communication with said tube, and that is configured to vacuumize said tube,
   wherein said controller is configured to
      control said moving unit to move said main body to a position where said tube is aligned with the target object in the first direction;
      control said driving component to move said main body in the first direction so as to make said tube move toward the target object, and
      control said vacuum pump to vacuumize said tube so as to carry the target object by sucking when it is determined that the force exerted on said force sensor achieves a first predetermined threshold.

3. The transferring system as claimed in claim 2, wherein said controller is further configured to:
   after controlling said vacuum pump to vacuumize said tube, control said moving unit to move the target object to a target position, control said vacuum pump to break vacuum in said tube so as to release the target object when it is determined that the force exerted on said force sensor achieves a second predetermined threshold.

4. The transferring system as claimed in claim 1, further comprising a vacuum pump that is electrically connected to said controller, that is in spatial communication with said tube, and that is configured to vacuumize said tube and break vacuum in said tube.

5. The transferring system as claimed in claim 4, further comprising an image capturing device electrically connected to said controller, wherein said controller is configured to when the target object is being carried by said tube, control said image capturing device to capture an image of the target object to result in an object image, determine an angular displacement of the target object from a preferred angular position by comparing the object image with a reference image that is related to a reference object at the preferred angular position, and control, based on the angular displacement, said rotary motor to drive said tube to rotate in a manner that the target object is rotated to the preferred angular position.

6. The transferring system as claimed in claim 5, wherein said controller is configured to control said rotary motor to drive said tube to revolve by using feedback control techniques based on the angular position of said tube detected by said rotary encoder.

7. The transferring system as claimed in claim 1, wherein said connecting component includes:

a head portion that is positioned outside of said first through hole of said extension part and that has an external diameter greater than an internal diameter of said first through hole;

an extending portion that extends from said head portion in the first direction, that has an external diameter smaller than the external diameter of said head portion, that passes through said first through hole of said extension part, and that is connected to said carrier; and an elastic element that is disposed between said extension part and said carrier.

8. The feeding device as claimed in claim 7, wherein said elastic element is a helical compression spring that surrounds said extending portion.

* * * * *